United States Patent [19]

Welty

[11] 3,906,081
[45] Sept. 16, 1975

[54] FLUIDIZED REACTOR REDUCTION OF UF$_6$ TO UO$_2$

[75] Inventor: Richard K. Welty, Richland, Wash.

[73] Assignee: Exxon Nuclear Company Inc., Bellevue, Wash.

[22] Filed: May 31, 1973

[21] Appl. No.: 365,508

[52] U.S. Cl. ............... 423/261; 423/253; 423/260
[51] Int. Cl. ............................................ C01g 43/02
[58] Field of Search ............ 423/261, 260, 253, 19; 252/301.1 R

[56] References Cited
UNITED STATES PATENTS

| | | | |
|---|---|---|---|
| 2,953,430 | 9/1960 | Leaden et al. | 423/261 |
| 3,160,471 | 12/1964 | Knudsen et al. | 423/261 |
| 3,168,369 | 2/1965 | Reese et al. | 423/261 X |
| 3,179,491 | 4/1965 | Ikajl et al. | 423/261 |
| 3,235,327 | 2/1966 | Blundell et al. | 423/261 |
| 3,333,930 | 8/1967 | Grant et al. | 423/253 |
| 3,394,997 | 7/1968 | Hollander | 423/253 |
| 3,547,598 | 12/1970 | Knudsen | 423/261 |
| 3,765,844 | 10/1973 | Rocle | 423/261 X |

FOREIGN PATENTS OR APPLICATIONS

| | | | |
|---|---|---|---|
| 1,941,693 | 2/1971 | Germany | 423/253 |
| 1,341,873 | 9/1963 | France | 423/253 |

*Primary Examiner*—Richard D. Lovering
*Assistant Examiner*—R. E. Schafer
*Attorney, Agent, or Firm*—Joseph J. Dvorak

[57] ABSTRACT

A two stage fluid bed process for converting UF$_6$ to UO$_2$ is provided. In the first stage UF$_6$ is converted, preferably in two separate fluid beds, to U$_3$O$_8$ by first forming UO$_2$F$_2$ solids and treating the UO$_2$F$_2$ with steam to produce U$_3$O$_8$. The U$_3$O$_8$ is reduced at relatively low temperatures i.e., at about 450°C. to about 500°C., in a second stage to uranium dioxide.

7 Claims, 1 Drawing Figure

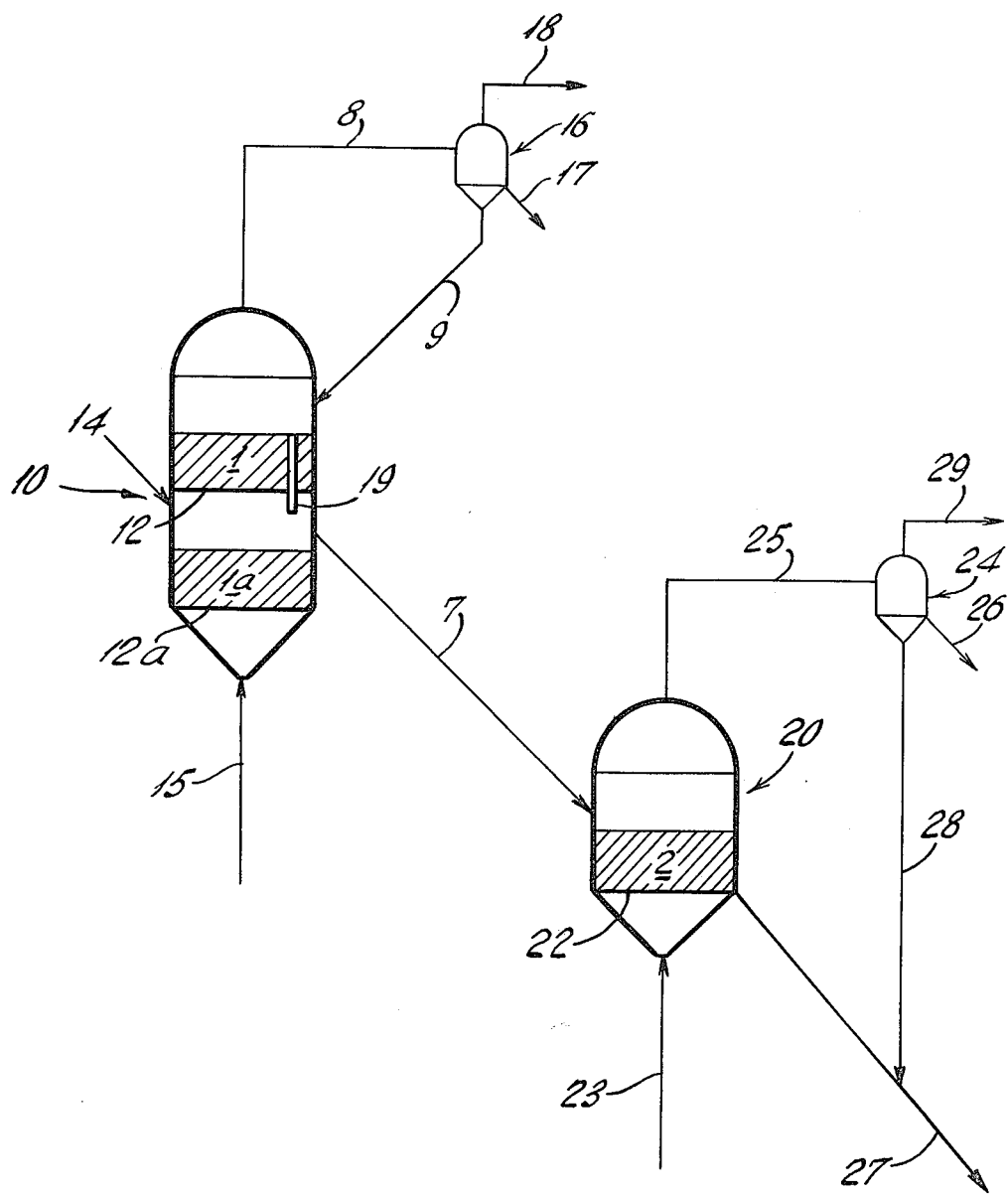

FLUIDIZED REACTOR REDUCTION OF UF$_6$ TO UO$_2$

BACKGROUND OF THE INVENTION

This invention relates to a two-stage fluid bed process for the production of uranium dioxide from uranium hexafluoride. In particular, this invention relates to new and improved techniques for converting uranium hexafluoride to a sinterable uranium dioxide of relatively low fluoride concentration.

There are a number of fluid bed techniques that have been proposed for converting uranium hexafluoride to uranium dioxide. For example, U.S. Pat. No. 3,160,471 discloses a single stage fluidization process in which uranium hexafluoride is contacted with stoichiometric excess of steam and hydrogen to convert the uranium hexafluoride to uranium dioxide. In U.S. Pat. No. 3,547,598 a two-stage fluid bed process is disclosed in which uranium hexafluoride, steam and hydrogen are reacted in a first fluid bed reactor to form a mixture of intermediate uranium oxides. These intermediate uranium oxide products are then fluidized with steam and hydrogen in a second reactor where they are converted to uranium dioxide. Although these processes offer the promise of cost savings inherent in fluidization techniques, unfortunately in order to reduce the fluoride content of the uranium dioxide produced to acceptable levels, for example, below about 0.011 to 0.015 wt. % based on the weight of uranium dioxide produced, the solid uranium oxides must be maintained within the bed for extensive periods of time. Moreover, the uranium dioxide is formed at relatively high temperatures that adversely affect the sinterable quality of the dioxide.

SUMMARY OF THE INVENTION

According to the present invention there is provided an improved process for the conversion of uranium hexafluoride to sinterable uranium dioxide. The present process contemplates, as a first stage, establishing a fluidized bed of uranyl fluoride (UO$_2$F$_2$) solids, which is maintained at temperatures above about 730°C., and countercurrently contacting the uranyl fluoride solids with steam in excess of that required to convert the uranyl fluoride to triuranium octoxide (U$_3$O$_8$). Thereafter, the triuranium octoxide is fluidized in a second stage and reduced with hydrogen in the presence of steam at temperatures below about 500°.

In the practice of the present invention, it is particularly preferred that the fluidized bed of uranyl fluoride solids be established in a multiple bed reactor and preferably a two-bed reactor. Uranium hexafluoride and steam are introduced at temperatures ranging generally from about 658° to about 780°C. into a first fluid bed of seed particles of uranyl fluoride. The steam is used in amounts sufficient to convert the uranium hexafluoride to uranyl fluoride. The uranyl fluoride so produced is then introduced into the second bed where it is fluidized and contacted with steam in excess of the stoichiometric amount required to convert the uranyl fluoride to triuranium octoxide. Temperatures in this second bed are maintained in the range of about 730° to about 780°C. and preferably above about 750°C. Thus, the fluoride concentration of the triuranium octoxide is below at least 0.010 wt. % and generally as low as about 0.0025 to about 0.0005 wt. % thereby assuring that the UO$_2$ will be substantially free of fluoride.

The triuranium octoxide so produced is rapidly converted in a second stage reactor by fluidizing the triuranium octoxide at temperatures below about 500°C. and generally in the range of about 450 to 500°C. while countercurrently contacting the uranium trioxide in the fluid bed with excess hydrogen containing steam. For example, the mole ratio of hydrogen to steam is generally in the range of 2 to 1 to about 1.5 to 1. The ratio of hydrogen to triuranium octoxide is generally in the range of 3 to 1 to about 2.5 to 1. Thus, the reduction is carried out at relatively low temperatures with the concommitant result that the product is very easily sintered.

In another embodiment of the present invention a bed of uranyl fluoride solids is established in a single bed reactor and converted therein to triuranium octoxide by introducing uranium hexafluoride and steam into a bed of seed particles of uranyl fluoride and maintaining the bed temperature in the range of about 730° to about 780°C. The amount of steam used is in excess of that required to convert uranium hexafluoride to triuranium octoxide. Thereafter the triuranium oxide is reduced in the second stage reactor with hydrogen and steam at temperatures ranging from about 450° to about 500°C.

These and other features of the present invention will be better understood by reference to the detailed description which follows, especially when considered in connection with the drawings herein.

BRIEF DESCRIPTION OF THE DRAWINGS

The single FIGURE is a schematic diagram illustrating the use of two fluid bed reactors in the practice of the instant process.

DETAILED DESCRIPTION

Referring specifically to the drawing, two separate fluidization reactors 10 and 20 are shown. Each of these reactors is provided with a typical grid to support the fluidized bed of solids. The design of the grid is not part of the present invention and consequently the grid is merely indicated as lines 12 and 12a in reactor 10 and as lines 22 in reactor 20. Also, in reactor 10 two fluidized beds of solids are shown as 1 and 1a and in reactor 20 one fluidized bed of solids is shown generally as 2.

In the practice of the present invention a fluid bed 1 of uranyl fluoride (UO$_2$F$_2$) is established by seeding the first reactor 10 with uranyl fluoride particles of fluidizable particle size. For example, particles being an average particle size of about 300$\mu$ are sufficient. The amount of seed material employed, of course, is not fixed but varies greatly depending upon the reactor size, desired throughput and the like. Thereafter, uranium hexafluoride and steam are introduced into fluid bed 1 of reactor 10. To prevent channelling of the gases, the uranium hexafluoride is preferably introduced via line 14 below grid plate 12. Steam is introduced via line 15 and passes upwardly through the reactor into fluid bed 1. Optionally steam can be introduced into fluid bed 1 in substantially the same manner as the uranium hexafluoride by another line (not shown).

The temperature in bed 1 is maintained generally in the range of from about 658° to 780°C. and preferably 658° to 680°C. The steam is used in amounts sufficient to convert the uranium hexafluoride to uranyl fluoride.

Next, the uranyl fluoride is advanced to fluid bed 1a by means of a downcomer 19 or other suitable means. The uranyl fluoride introduced into bed 1a is fluidized and countercurrently contacted there with steam in excess of the stoichiometric amount required to convert the uranyl fluoride to triuranium octoxide. The steam is introduced via line 15. Generally, the temperature in bed 1a is maintained in the range of from about 730° to about 780°C. with about 750° to about 760°C. being preferred.

Optionally, a single bed of uranyl fluoride particles is established in a fluid bed reactor by introducing uranium hexafluoride and steam into a bed of seed particles of uranyl fluoride. In this embodiment, however, the temperature of the bed is maintained in the range of about 730° to about 780°C. and the excess steam is used to ultimately convert the uranyl fluoride formed to triuranium octoxide.

In any event, generally the mole ratio of steam to uranium hexafluoride introduced into reactor 10 will be in the range of 10 to 1 and preferably in the range of about 5 to 1. Effluent gases are removed via line 8 and pass through a solid recovery system shown as vessel 16. These solids can be returned via line 9 to fluid bed 1 or removed via line 17 for further processing. Gases leaving the solids recovery system 16 via line 18 may be recycled or recovered as so desired.

In view of the high temperatures prevailing in fluid bed 1a of reactor 10 and the large excess of steam, the uranyl fluoride solids are rapidly oxidized to triuranium octoxide. The triuranium octoxide is removed, for example, via line 7 and introduced into reactor 20. Line 7 is provided with suitable means (not shown) to prevent gases from reactor 20 entering reactor 10.

In reactor 20, the uranyl triuranium octoxide is fluidized and reduced to uranium dioxide. Generally, the triuranium octoxide will be maintained at temperatures below about 500°C., for example, in the range of about 450°C. to about 500°C., and preferably in the range of about 470° to 475°C. Hydrogen gas is introduced via line 23 to countercurrently contact the triuranium octoxide and reduce it to uranium dioxide. The amount of hydrogen introduced into reactor 20 is in excess of the stoichiometric amount of hydrogen required to convert the triuranium oxide to uranium dioxide. For example, the mole ratio of hydrogen to uranium triuranium octoxide is in the range of 3 to 1 to 2.5 to 1.

The mole ratio of hydrogen to steam is generally 2 to 1 and preferably 1.5 to 1. Apparently, the steam enhances and/or catalyzes the reduction of triuranium octoxide by hydrogen. Fines carried from reactor 20 are recovered for example, by means of the separation vessel 24 which is connected to reactor 20 via line 25. Such fines are removed via line 26 or are transferred via line 28 to product removal line 27. The off gas which contains steam and hydrogen is removed via line 29 and sent to a gas recovery facility where the hydrogen can be separated and recycled.

By staging the conversion of uranium hexafluoride to uranium dioxide in the manner described herein, the fluoride content of the uranium dioxide is reduced to acceptable levels below about 0.011 wt. % and the sinterability of the uranium dioxide powder is enhanced.

What is claimed is:
1. A method of producing sinterable uranium dioxide comprising:
   a. establishing a fluidized bed of uranyl fluoride solids;
   b. maintaining the bed of uranyl fluoride solids at temperatures in excess of 730°C. while countercurrently contacting said solids with excess steam to convert the uranyl fluoride to triuranium octoxide; and
   c. thereafter fluidizing the triuranium octoxide at temperatures below about 500°C. while countercurrently contacting the triuranium octoxide with excess hydrogen in the presence of steam whereby uranium dioxide is formed.

2. The method of claim 1 wherein said bed of uranyl fluroide solids is established by introducing uranium hexafluoride and steam countercurrently into a fluid bed of seed particles of uranyl fluoride solids and the temperature of the bed is maintained in the range of from about 658° to about 780°C.

3. The method of claim 2 wherein the temperature of the bed is maintained in the range of about 658° to about 680°C. and the uranyl fluoride solids are then transferred to a second fluid bed and further treated as in steps (b) and (c).

4. The method of claim 3 wherein triuranium octoxide is fluidized and reduced in a separate reactor at a temperature in the range of from about 450° to about 500°C. with excess hydrogen and steam, the ratio of hydrogen to triuranium octoxide being in the range of from about 3 to 1 to about 2.5 to 1 and the ratio of hydrogen to steam being in the range of about 2 to 1 to about 1.5 to 1.

5. The process of claim 1 wherein the temperature of the fluidized bed of uranyl fluoride solids is maintained at a temperature in the range of about 730° to 780°C.

6. The process of claim 1 wherein the ratio of steam to uranium hexafluoride introduced into the bed of uranyl fluoride solids ranges from about 10 to 1 to about 5 to 1.

7. A staged fluidized process of converting uranium hexafluoride to uranium dioxide comprising countercurrently introducing uranium hexafluoride and steam into contact with a first fluid bed of seed particles of uranyl fluoride solids; maintaining the first bed of uranyl fluoride solids at temperatures in the range of about 658° to 680°C. whereby uranium hexafluoride is converted to uranyl fluoride; transferring said uranyl fluoride solids to a second fluid bed; maintaining said second fluid bed at temperatures in the range of about 730° to about 780°C.; while countercurrently contacting said second fluidized bed of uranyl solids with excess steam for a time sufficient to convert uranyl fluoride solids to triuranium octoxide; transferring said triuranium octoxide solids into a second reactor; fluidizing and countercurrently contacting said triuranium octoxide solid with excess hydrogen in the presence of steam at temperatures in the range of about 450° to 500°C. whereby said triuranium octoxide solids are converted to uranium dioxide.

\* \* \* \* \*